United States Patent [19]

Sarrafzadeh-Khoee

[11] Patent Number: 6,097,477
[45] Date of Patent: Aug. 1, 2000

[54] LASER SPECKLE STRAIN AND DEFORMATION SENSOR USING LINEAR ARRAY IMAGE CROSS-CORRELATION METHOD FOR SPECIFICALLY ARRANGED TRIPLE-BEAM TRIPLE-CAMERA CONFIGURATION

[75] Inventor: Adel K. Sarrafzadeh-Khoee, Radford, Va.

[73] Assignee: American Research Corporation of Virginia, Radford, Va.

[21] Appl. No.: 08/250,489

[22] Filed: May 27, 1994

[51] Int. Cl.[7] ........................................ G01B 9/02
[52] U.S. Cl. ........................ 356/35.5; 356/345; 356/354
[58] Field of Search ................... 356/35.5, 345, 356/354

[56] References Cited

U.S. PATENT DOCUMENTS

| | | | |
|---|---|---|---|
| 4,432,239 | 2/1984 | Bykov | 356/35.5 |
| 4,474,466 | 10/1984 | McDonach et al. | 356/35.5 |
| 4,872,751 | 10/1989 | Hercher | 356/35.5 |
| 4,967,093 | 10/1990 | Takemori | 356/376 |
| 4,984,883 | 1/1991 | Winocur | 356/35.5 |
| 5,042,944 | 8/1991 | Lukasiewicz et al. | 356/367 |
| 5,166,742 | 11/1992 | Kobayashi et al. | 356/35.5 |
| 5,175,601 | 12/1992 | Fitts | 356/376 |
| 5,212,390 | 5/1993 | Lebeau et al. | 356/376 |

FOREIGN PATENT DOCUMENTS

| | | | |
|---|---|---|---|
| 2554601 | 5/1985 | France | 356/345 |
| 1275248 | 12/1986 | U.S.S.R. | 356/345 |

OTHER PUBLICATIONS

Yamaguchi, Ichirou, "Automatic Measurement of In–Plane Translation by Speckle Correlation Using a Linear Image Sensor", 1986 The Institute of Physics, pp. 944–948.

Yamaguchi, Ichirou, "A Laser Speckle Strain Gauge", J. Phys. E. Sci.Instrum. vol. 14, No. 11, Nov. 1981, pp. 1270–1273.

Sarrafzadeh et al., "Cross–Correlation Optical Strain Sensor for Wind Tunnel Test Instrumentation", Final Report for NASA Langley Research Center by American Research Corporation of Virginia (Aug. 1990), pp. 7–50.

*Primary Examiner*—Robert H. Kim
*Attorney, Agent, or Firm*—James Creighton Wray; Meera P. Narasimhan

[57] ABSTRACT

The invention provides a method of triple-beam and triple-sensor in a laser speckle strain/deformation measurement system. The triple-beam/triple-camera configuration combined with sequential timing of laser beam shutters is capable of providing indications of surface strain and structure deformations. The strain and deformation quantities, the four variables of surface strain, in-plane displacement, out-of-plane displacement and tilt, are determined in closed form solutions.

10 Claims, 3 Drawing Sheets

LASER SPECKLE STRAIN AND DEFORMATION SENSOR USING LINEAR ARRAY IMAGE CROSS-CORRELATION METHOD FOR SPECIFICALLY ARRANGED TRIPLE-BEAM TRIPLE-CAMERA CONFIGURATION

The government has rights in this invention pursuant to Contract No. NASA 1-19305 awarded by NASA.

BACKGROUND OF THE INVENTION

Previous strain measuring methods, such as dual beam or double sensor approaches, could be used only for measuring surface strain with geometrical approximations.

SUMMARY OF THE INVENTION

The new invention incorporates a triple-beam triple-sensor. The new system determines surface strain in a closed-form solution. The invention determines the structural deformations, in-plane displacement, out-of-plane displacement and deflection. The invention also determines rigid-body movements, translation or tilt.

Commercial applications exist in materials and structural testing at very high temperatures.

The invention is of interest to firms which specialize in manufacturing or using the mechanical testing equipment and strain gauge sensors.

The invention provides very high temperature optical strain measurement instrumentation based on one-dimensional laser speckle imaging and digital cross-correlation techniques. The invention provides application of coherent laser beam illumination and scattering techniques for the measurement of optically rough surfaces displacements; integration of high-speed laser beam shutters and high-resolution linear array imaging cameras (triple-beam/triple-camera configuration) for the measurement of deformations as well as the surface strain; implementation of the microprocessor-based cross-correlation calculations for the detected one-dimensional speckle data to provide direct information on the surface strain and deformations; and development of a dedicated operating software program incorporating digital signal processing hardware/software modules, data acquisition devices and analysis for streamlined test measurement and control of the instrument. Innovations are provided in experimental mechanics and laser speckle metrology.

Fundamental relationships are provided between the rough-surface induced diffracted laser speckle characteristics, such as spatial movements, and surface deformation variables, such as strain, in-plane displacement, out-of-plane displacement and tilt. It has been found that the diffracted speckles formed by point-wise laser beam interrogation move with respect to the associated object surface displacement variables. From basic analysis of optical diffraction patterns, laser speckle movement versus object displacements is represented by:

$$A_X = +a_x\left(\frac{L_o \cos^2\theta_i}{L_i \cos\theta_o} + \cos\theta_o\right) - a_z\left(\frac{L_o \cos\theta_i \sin\theta_i}{L_i \cos\theta_o} + \sin\theta_o\right) - \left[\varepsilon_{xx}\left(\frac{\sin\theta_i}{\cos\theta_o} + \tan\theta_o\right)L_o + \Omega_y\left(\frac{\cos\theta_i}{\cos\theta_o} + 1\right)L_o\right] \quad (1)$$

where:
$A_x$=Speckle shift (displacement) along the X-axis, in the plane of illumination/observation direction, parallel to the intersect line (x-axis) for the object and observation planes.
$a_x$=in-plane translation (displacement) of the object within the interrogation zone (optical gauge length) along the x-axis.
$a_z$=out-of-plane displacement (deflection) of the object along the z-axis.
$\Omega_y$=Rotation (tilt) with respect to the y-axis.
$\varepsilon_{xx}$=Uni-axial strain.
$\theta_i$=Angle of illumination (incident) beam from the normal direction.
$\theta_o$=Angle of observation from the normal direction.
$L_i$=Radius of curvature of the illumination (incident) beam.
$L_o$=Observation distance from the object interrogation point.

For the single-beam/dual-camera configuration, the differential and summed speckle shift parameters, $\Delta A_x$ and $\Sigma A_x$ are obtained from the relation:

$$\Delta A_x = A_x(\theta_i, \theta_o) - A_x(\theta_i, -\theta_o) \quad (2)$$

and $$\Sigma A_x = A_x(\theta_i, \theta_o) + A_x(\theta_i, -\theta_o) \quad (3)$$

In the case of normal incident ($\theta_i=0$) and oblique observation, i.e. single-beam/dual-camera configuration, $\Delta A_x$ and $\Sigma A_x$ expressions reduce to:

$$\Delta A_x = -2L_o \varepsilon_{xx} \tan\theta_o - 2a_z \sin\theta_o \quad (4)$$

and $$\sum A_x = 2a_x\left(\frac{L_o}{L_i \cos\theta_o} + \cos\theta_o\right) + 2L_o\left(\frac{1}{\cos\theta_o} + 1\right) \quad (5)$$

Specifically, for $\theta_o=45$ degrees the relations are simplified as:

$$\Delta A_X = -2L_o \varepsilon_{xx} - \sqrt{2}\, a_z \quad (6)$$

and $$\sum A_x = 2\left(\frac{\sqrt{2}\, L_o}{L_i} + \frac{\sqrt{2}}{2}\right)a_x + 2L_o(\sqrt{2} + 1)\Omega_y \quad (7)$$

similarly, for dual-beam/single-camera configuration, the associated differential/summed speckle shifts are expressed as $$\Delta A'_x = A'_x(\theta_i, \theta_o) - A'_x(-\theta_i, \theta_o) \quad (8)$$

and $$\Sigma A'_x = A'_x(\theta_i, \theta_o) + A'_x(-\theta_i, \theta_o) \quad (9)$$

i.e.:

$$\Delta A'_x = -2a_z L'_o \cos\theta_i \sin\frac{\theta_i}{L'_i \cos\theta_o} - 2\varepsilon_{xx} L'_o \frac{\sin\theta_i}{\cos\theta_o} \quad (10)$$

and $$\sum A'_x = +2a_x\left(\frac{L'_o \cos^2\theta_i}{L'_i \cos\theta_o} + \cos\theta_o\right) - 2a_z \sin\theta_o - L'_o\left[2\varepsilon_{xx}\tan\theta_o - 2\Omega_y\left(\frac{\cos\theta_i}{\cos\theta_o}\right) + 1\right] \quad (11)$$

In the case of oblique incident and normal observation, e.g. $\theta_i=45$ and $\theta_o=0$, $\Delta A'_x$, and $\Sigma A'_x$ expressions reduce to:

$$\Delta A'_x = -\frac{L'_o}{L'_i} a_z - \sqrt{2} L'_o \varepsilon_{xx} \qquad (12)$$

and $$\sum A'_X = 2\left(\frac{L'_o}{2L'_i} + 1\right) a_x + 2L'_o\left(\frac{\sqrt{2}}{2} + 1\right) \Omega_y \qquad (13)$$

Where $\Delta A'_x$, $\Sigma A'_x$, $L'_i$, $L'_o$ are now the new parameters for the dual-beam/single-camera configuration. Therefore, the algebraic equations (6), (7), (12) and (13) can be solved for the four unknown variables, $a_m$, $a_z$, $e_{xx}$ and $\Omega_y$, having known the four parameters on the left hand side of the equations.

Equations (6) and (12) can be solved for the two unknown variables, $a_z$ and $\varepsilon_{xx}$. To solve these equations, parameters, $\Delta A_x$ and $\Delta A'_x$ are first determined. These differential speckle shift parameters are calculated by using the cross-correlation for determining the individual speckle displacements, i.e. $\Delta A_x$ and $\Delta A'_x$. For the sake of speed, the cross-correlation functions are obtained in frequency domain using FFT (fast Fourier transformation) algorithms. However, the speckle shift, as represented by the movement of the "peak" for the cross-correlation function from its initial position, is typically obtained in terms of number of image pixels. These incremental differential speckle shifts are consequently accumulated to provide the total shift for the entire range of speckle displacements. The full range of speckle displacements represent the total object deformation and strain values. In order to obtain the unknown variables (i.e. $a_z$ and $\varepsilon_{xx}$) in terms of units, they are converted to micrometer units by multiplying the values by high-resolution camera pixel array pitch (13 µm). Therefore, substituting the values of $\Delta A_x$, $\Delta A'_x$, $L_o$, $L'_i$ and $L'_o$ in units of dimension (e.g. µm) into the equations (6) and (12) allows the key variables of interest (i.e. $a_z$ and $\varepsilon_{xx}$) to be directly determined (i.e., given: $L_o$, $L'_i$ and $L'_o$ and measured values $\Delta A_x$ and $\Delta A'_x$, find: $a_z$ and $\varepsilon_{xx}$).

The algebraic solutions for $a_z$ and $\varepsilon_{xx}$ are formulated in the strain blocks where the "blocks" are individual software modules that each perform a specific task. The $\Delta A_x$ and $\Delta A'_x$ parameters for the accumulated $\Delta A_x$ and $\Delta A'_x$ values measured from the set of our separate beams/speckle images are also obtained within the strain blocks. However, the four raw data inputs into the strain blocks (i.e. accumulated values of $\Delta A_x$ and $\Delta A'_x$ for the set) are first calculated in the X-correlation block.

If $L'_o \ll L'_i$ (for a collimated beam), equation (12) reduces to:

$$\Delta A'_X \equiv -\sqrt{2} L'_o \varepsilon_{xx} \qquad (14)$$

i.e.:

$$\varepsilon_{xx} = -\frac{\Delta A'_X}{\sqrt{2} L'_o} \qquad (15)$$

Hence, substituting $\varepsilon_{xx}$ into equation (6), one can solve for $a_z$, i.e.:

$$a_z = -\frac{1}{\sqrt{2}}\left(\Delta A_X - 2L_o\Delta \frac{A'_X}{\sqrt{2} L'_o}\right) \qquad (16)$$

However, the existing approach implemented in the software program (i.e. the Strain Block) does not use these reduced solutions.

Equations (7) and (13) can be solved for the other two unknown variables, $a_x$ and $\Omega_y$. Similar to the previous approach, the two known variables can be determined from the algebraically summed parameters, $\Sigma A_x$ and $\Sigma A'_x$, (i.e., given: $L_o$, $L_i$, $L'_i$ and $L'_o$ and measured $\Sigma A_x$ and $\Sigma A'_x$, find: $a_x$ and $\Omega_y$).

For the approximate solution, i.e. $L_o \ll L_i$ and $L'_o \ll L'_i$, equations (7) and (13) reduce to:

$$\Sigma A_x = \sqrt{2} a_x + 2L_o(\sqrt{2}+1)\Omega_y \qquad (17)$$

and $$\Sigma A'_x = 2a_x + (\sqrt{2}+2)L'_o\Omega_y \qquad (18)$$

Again, the $a_x$ and $\Omega_y$ variables are obtained from the non-approximated algebraic equation (7) and (13) in the existing Strain Block software module. The above formulations briefly show the basic relationship among the laser speckle shifts, the associated subtraction/addition parameters, and deformation variables in question.

Speckle image acquisition is performed through special sequence of laser beam shutter timing and camera captures. Each of the three customized speckle-detection configurations, i.e. single-beam/dual-camera, dual-beam/single-camera or triple-beam/triple-camera arrangements requires a specific shutter timing/camera capture procedure. The associated three data-acquisition methods with the associated shutter/camera timing sequences are illustrated in the Tables I, II and III below. Note that these tables correspond to the specific geometric arrangements of the sensor head as illustrated earlier in FIG. 6. Therein, $S_{1,2,3}$ are three shutter, $B_{1,2,3}$ are the beams, and $C_{1,2,3}$ are the cameras.

TABLE I

Single-Beam/Dual-Camera Configuration (A)

| Sequence | $S_1$ | $S_2$ | $S_3$ | $B_1$ | $B_2$ | $B_3$ | $C_1$ | $C_2$ | $C_3$ |
|---|---|---|---|---|---|---|---|---|---|
| Begin | Close | Close | Open | Off | Off | On | Acquire | Off | Off |
| End | Close | Close | Open | Off | Off | On | Off | Acquire | Off |

TABLE II

Dual-Beam/Single-Camera Configuration (B)

| Sequence | $S_1$ | $S_2$ | $S_3$ | $B_1$ | $B_2$ | $B_3$ | $C_1$ | $C_2$ | $C_3$ |
|---|---|---|---|---|---|---|---|---|---|
| Begin | Open | Close | Close | On | Off | Off | Off | Off | Acquire |
| End | Close | Open | Close | Off | On | Off | Off | Off | Acquire |

TABLE III

Triple Beam/Triple-Camera Configuration (C)

| Sequence | $S_1$ | $S_2$ | $S_3$ | $B_1$ | $B_2$ | $B_3$ | $C_1$ | $C_2$ | $C_3$ |
|---|---|---|---|---|---|---|---|---|---|
| Begin (B) | Open | Close | Close | On | Off | Off | Off | Off | Acquire |
| End | Close | Open | Close | Off | On | Off | Off | Off | Acquire |
| Begin (A) | Close | Close | Open | Off | Off | On | Acquire | Off | Off |
| End | Close | Close | Open | Off | Off | On | Off | Acquire | Off |

The invention provides a method of triple-beam and triple-sensor in a laser speckle strain/deformation measurement system. The triple-beam/triple-camera configuration combined with sequential timing of laser beam shutters is capable of providing indications of surface strain and structure deformations. The strain and deformation quantities, the four variables of surface strain, in-plane displacement, out-of-plane displacement and tilt, are determined in closed form solutions.

A preferred deformation sensor apparatus has first, second and third laser beam sources aiming laser beams at a spot on an object surface to be measured.

First, second and third cameras receive detracted speckles respectively from the third beam, and from the first and second beams.

In a preferred embodiment, the first, second and third laser beams originate in a single laser beam source, are divided by beam splitters and are interrupted by first, second and third shutters.

First, second and third cameras are aligned with the first, second and third laser beams.

A beam splitter is aligned with the laser source for splitting a laser from the laser source into a first beam projected at right angles from the beam splitter, a second beam perpendicular to a third beam and parallel to the first beam, and a third beam perpendicular to the first and second beams and aligned with the laser beam source.

A first mirror is aligned with the first beam for projecting the first beam onto the spot on the object, and a second mirror is aligned with the second beam for projecting the second beam onto the spot.

A preferred method of determining strain and deformation of an object focuses a first side beam on a spot on the object. A second side beam is focused on a spot on the object, and a normal beam is focused on the spot. Defracted speckles are received from the normal beam on first and second camera imagers aligned near the first and second side beams. Defracted speckles are received from the side beams on a third camera imager positioned near the normal beam.

In a preferred method of carrying out the invention, a single laser beam is provided and split into the first side beam, the second side beam and the normal beam. Reflecting the first side beam with a first mirror directs the first side beam to the spot. Reflecting the second side beam from a second mirror directs the second side beam to the spot. The first, second and third beams are shuttered sequentially to distinguish readings.

These and further and other objects and features of the invention are apparent in the disclosure, which includes the above and ongoing written specification, with the claims and the drawings.

DETAILED DESCRIPTION OF THE DRAWINGS

Figure 1:
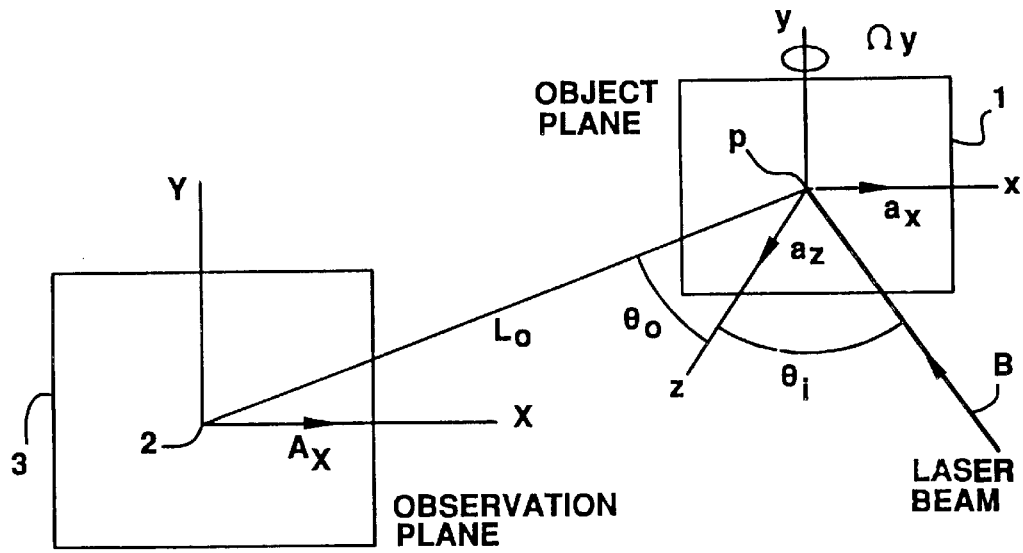
FIG. 1 shows a coordinate system of laser speckle displacement in diffraction field.

FIG. 1 shows the coordinate system for displacement in laser speckle for the diffraction field. The above relationship was used in proposed dual beam or double-sensor approaches in conjunction with the differential cross-correlation method to derive the desired strain measurements. The dual beam method allowed the cancellation of unwanted out-of-plane displacement components ($a_z$) due to the assumption based on planar wavefront illumination requirement and the automatic subtraction of cross-correlation values calculated from speckle images of each beam.

In the case of the double sensor configuration, the influence of $a_z$ on the differential speckle displacement, $\Delta A_x$, cannot be ignored. The details of such parametric relationships are presented in the above and following paragraphs.

A major contribution of the invention has been the adaptation of the above two methods of approach in a special multiple-beam/multiple-sensor configuration so that all four displacement variables of the object under deformation can be obtained. That is, to determine the in-plane displacement ($a_x$), out-of-plane displacement ($a_z$), strain ($\epsilon_{xx}$) and tilt ($\Omega_y$), four equations are needed for the above four unknown variables in Equation 1. These four relations can be obtained using subtraction and addition procedures for both the single-beam/dual-sensor and dual-beam/single-sensor configurations shown in FIGS. 2 and 3. Herein, the combined implementation of single-beam/dual-sensor and dual-beam/single-sensor configurations provides the triple-beam/triple-sensor configuration as shown in FIG. 4. The differential and summed procedures for the speckle shifts ($A_x$) in the triple-beam/triple-sensor configuration provide the four deformation variables.

FIG. 1 shows a coordinate system of laser speckle displacement in a defraction field. A laser beam B is directed to a point P on an object plane 1 at an angle $\theta_i$ to a zenith z. The laser speckle reflection $L_o$ from the object plane 1 is observed at a point 2 on the observation plane 3.

A small shift $a_x$ in the X direction of the object plane is noted by a larger shift $A_x$ in the observation plane. A shift $a_z$ normal to the object plane 1 also changes the angle $\theta_i$ of the reflected beam $L_o$ and therefore gives an incorrect change $A_x$ in the observation plane.

Figure 2:
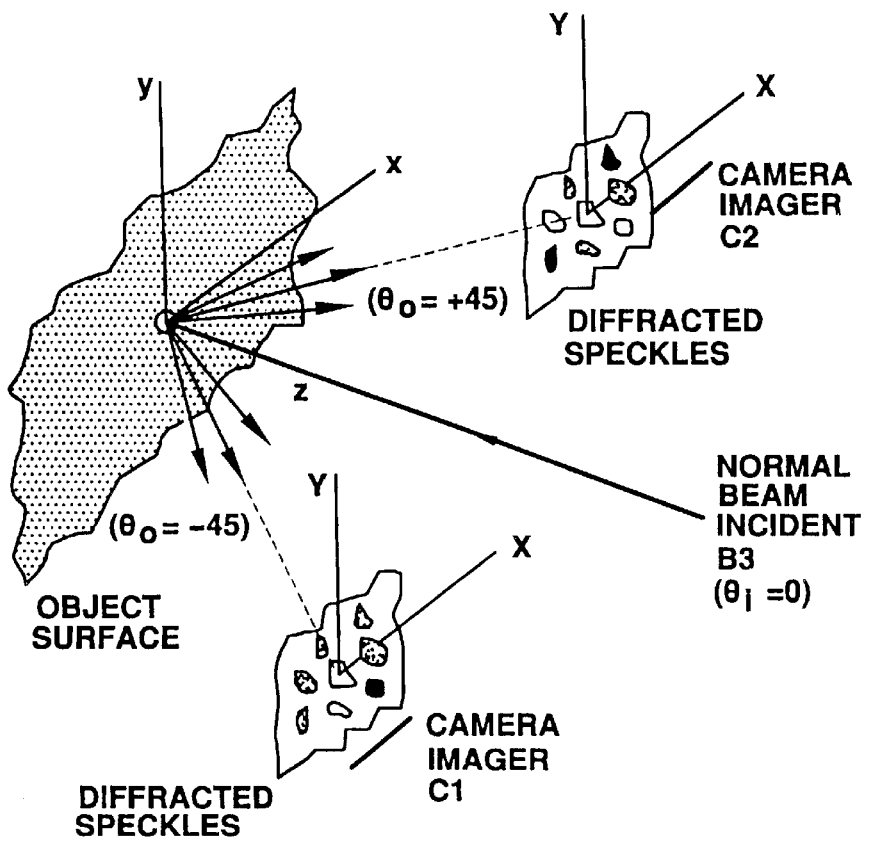
FIG. 2 schematically shows a single-beam/dual-camera system.

As shown in FIG. 2, a partial solution was introduced by a single-beam/dual camera configuration. A normal incident beam B3 on axis z is reflected by the surface spot to camera imagers C1 and C2. Movement of the surface changes the angles of reflection $\theta_0=-45°$ to camera imager C1, and $\theta_o=+45°$ to camera imager C1.

Figure 3:
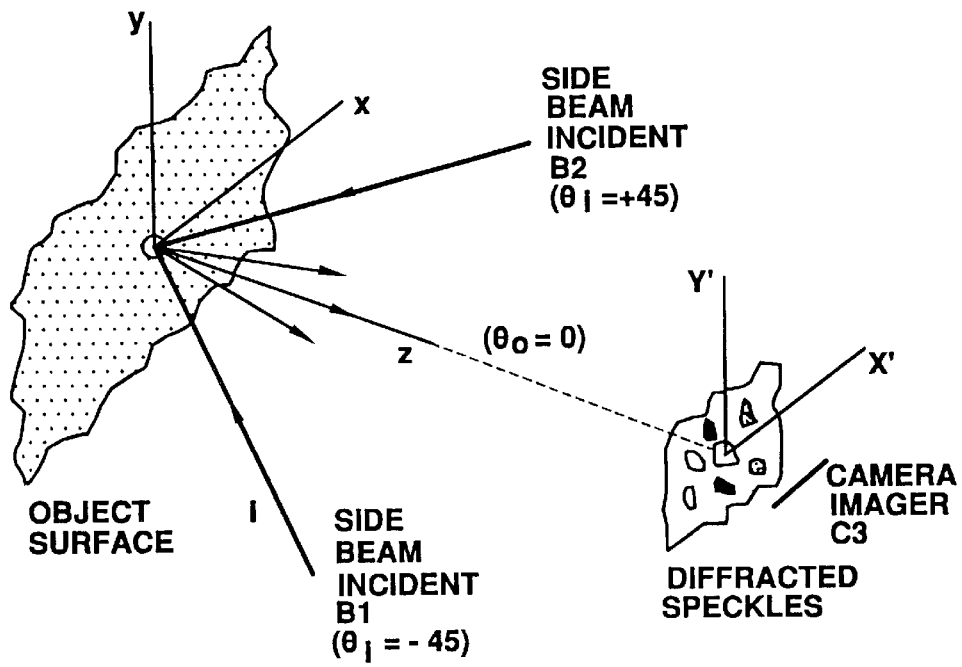
FIG. 3 schematically shows a dual-beam/single-camera configuration.
Figure 4:
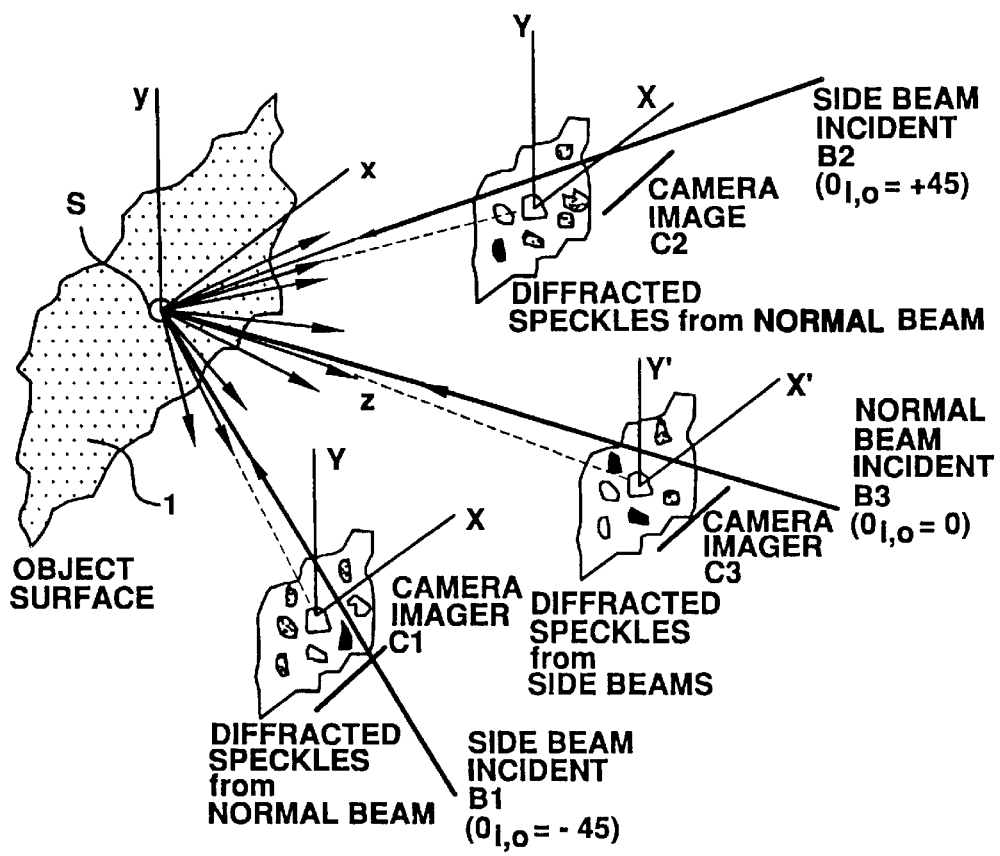
FIG. 4 schematically shows a triple-beam/triple-camera configuration.

Another solution as shown in FIG. 3 was the dual-beam/single-camera configuration. There two side beams B1 and B2 were directed respectively at $-45°$ and $+45°$ $\theta_i$ angles to a spot on the object surface. The beams were reflected along the zenith. Movement of the object surface was detected as radiations in the angle $\theta_o$ along the z axis of the reflected beam, as noted by the camera imager C3.

The present invention as shown in FIG. 4 provides information on four distinct variables, surface strain, in-plane displacement, out-of-plane displacement and tilt.

Incident side beams B1 and B2 are directed to the spot p on object surface 1 at initial angles from the z axis respectively of $\theta_i=-45°$ and $45°$. The reflected images are received by camera imager C3 along the z axis ($\theta_o=0$), and the movement of spot S is noted as deviations from the z axis. At the same time, a normal incident beam B3 is directed along the z axis and is reflected by the spot to camera imagers C1 and C2 at angles of $\theta_o=-45°$ and $+45°$, respectively. Deviations in positions of the spot S are noted as deviations in $\theta_o$ by movements of the defracted speckles on camera imager planes C1 and C2.

Figure 5:
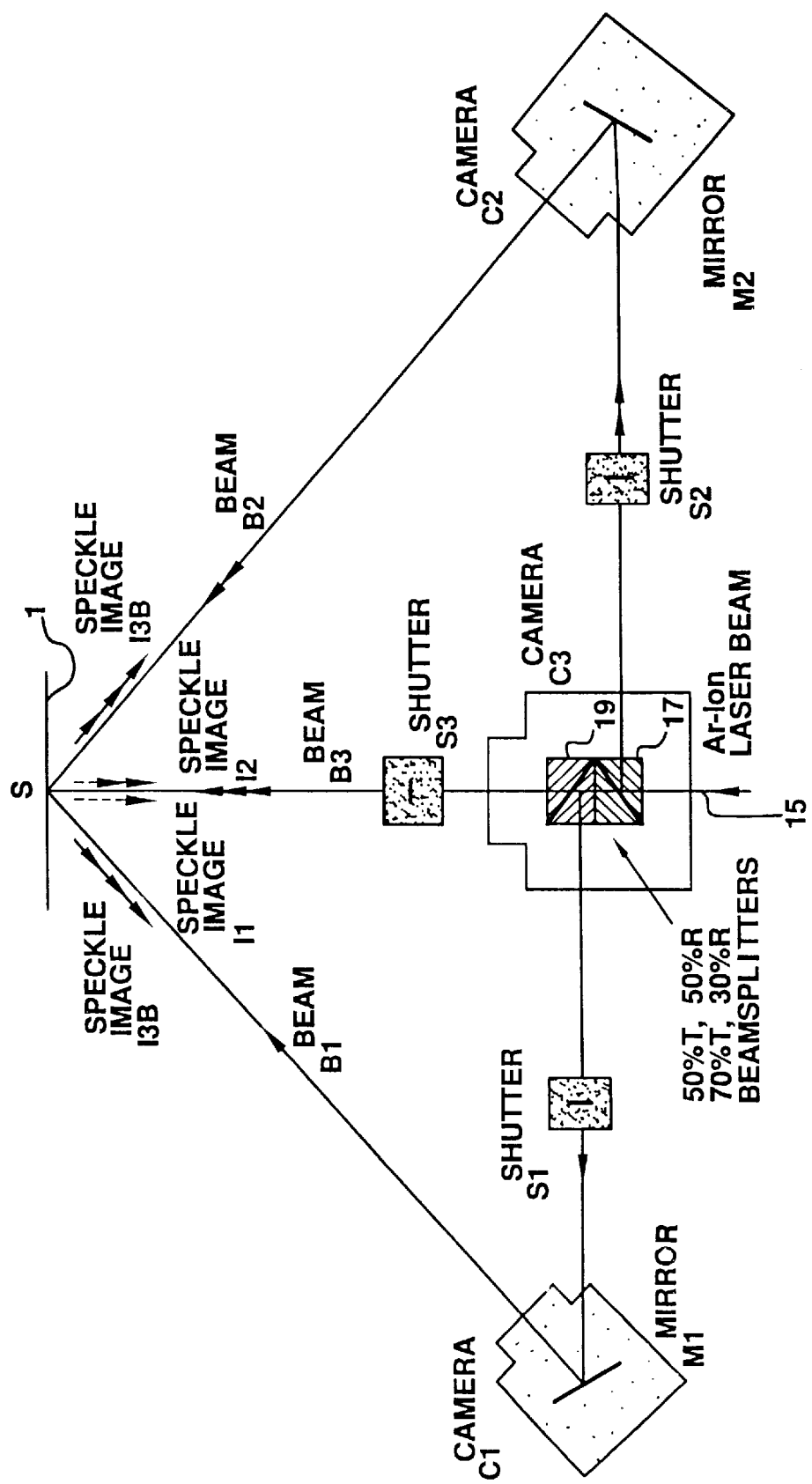
FIG. 5 shows a triple-beam/triple-camera method for laser speckle strain and deformation measurements.

A device for using the invention is shown in FIG. 5.

A Ar-Ion laser beam 15 is directed to beam splitters 17 and 19. Beam splitter 17 reflects 30% of the laser beam energy to the right through shutter S2 to mirror M2, which directs beam B2 to the spot S on the object surface. 70% of the laser energy is passed through to beam splitter 19, which reflects 50% of the energy through shutter S1 to mirror M1, which directs beam B1 to the spot S. The remaining 50% of the energy passes through beam splitter 19 and passes through shutter S3 as beam B3 to spot S. Speckle images I1 and I2 are reflected by speckles at spot S to camera imager C3, which is aligned on the axis of beam B3. Speckle images reflected by speckles on spot S from beam B3 are reflected as images I3B to camera C1 and I3A to camera C2.

Shutters S1, S2 and S3 open sequentially to allow the beams to be directed to spot S in sequences for coordinated camera captures, as shown in the Tables.

While the invention has been described with reference to specific embodiments, modifications and variations of the invention may be constructed without departing from the scope of the invention, which is defined in the following claims.

I claim:

1. Deformation sensor apparatus comprising first, second and third laser sources aiming laser beams at a spot on an object surface to be measured, and first, second and third camera imagers for receiving reflected speckle images from the spot, wherein the first and second cameras receive reflected speckle images respectively from the third beam, and wherein the third camera imager receives reflected speckle images from the first and second beams.

2. The apparatus of claim 1, further comprising a single laser source and wherein the first, second and third laser beams originate in the single laser beam source.

3. Deformation sensor apparatus comprising first, second and third laser sources aiming laser beams at a spot on an object surface to be measured, and first, second and third camera imagers for receiving reflected speckle images from the spot, further comprising a single laser source and wherein the first, second and third laser beams originate in the single laser source.

4. The apparatus of claim 4, wherein the first, second and third laser beams are sequentially interrupted by first, second and third sequential shutters.

5. The apparatus of claim 5, wherein the first, second and third camera imagers are axially aligned with the first, second and third laser beams.

6. The apparatus of claim 5, further comprising two beam splitters axially aligned with the laser source for splitting a laser from the laser source into the first beam projected at a right angle from the beam splitter, the second beam is perpendicular to the laser source and parallel to the first beam, the third beam perpendicular to the first and second beams and axially aligned with the laser beam source.

7. The apparatus of claim 6, further comprising a first mirror axially aligned with the first beam for projecting the first beam onto the spot on the object, and a second mirror axially aligned with the second beam for projecting the second beam onto the spot.

8. The method of determining strain and deformation of an object by focusing a first side beam on a spot on an object, focusing a second side beam on the spot on the object, and focusing a normal beam on the spot, receiving diffracted speckle images from the normal beam on first and second camera imagers axially aligned near the first and second side beams, and receiving diffracted speckle images from the first and second side beams on a third camera imager positioned near the normal beam.

9. The method of claim 8, further comprising providing a single laser beam and splitting the single laser beam into the first side beam, the second side beam and the normal beam, reflecting the first side beam with a first mirror for directing the first side beam to the spot and reflecting the second side beam from a second mirror for directing the second side beam to the spot.

10. The method of claim 9, further comprising sequentially shuttering the first, second and third beams.

* * * * *